United States Patent [19]
Halpern

[11] Patent Number: 6,106,572
[45] Date of Patent: Aug. 22, 2000

[54] FORWARD AND REVERSE HIERARCHICAL PAGE LEVEL DEBUGGER

[75] Inventor: Mordechai Halpern, Northborough, Mass.

[73] Assignee: Origins Software Company, Cambridge, Mass.

[21] Appl. No.: 09/047,643

[22] Filed: Mar. 25, 1998

[51] Int. Cl.[7] .................................................. G06F 9/45
[52] U.S. Cl. .................................. 717/4; 714/35; 714/38
[58] Field of Search ................................ 395/704; 717/4

[56] References Cited

U.S. PATENT DOCUMENTS

| | | | |
|---|---|---|---|
| 5,050,168 | 9/1991 | Paterson ..................................... | 714/35 |
| 5,301,198 | 4/1994 | Kawasaki ................................... | 714/25 |
| 5,371,747 | 12/1994 | Brooks et al. ............................. | 714/38 |
| 5,535,318 | 7/1996 | Motoyama et al. ..................... | 707/514 |
| 5,611,043 | 3/1997 | Even et al. ................................ | 714/38 |
| 5,664,159 | 9/1997 | Richter et al. ............................ | 703/23 |
| 5,687,074 | 11/1997 | Tanaka et al. ............................ | 700/26 |
| 5,732,273 | 3/1998 | Srivastava et al. ........................ | 717/4 |
| 5,758,061 | 5/1998 | Plum ......................................... | 714/35 |
| 5,815,653 | 9/1998 | You et al. ................................. | 714/38 |
| 5,963,740 | 10/1999 | Srivastava et al. ........................ | 717/4 |

OTHER PUBLICATIONS

Shimomura et al.; "VIPS: a visual debugger for list structures", IEEE/IEE Electronic Library[online], Proceedings of 14th Annual International Computer Software and Applications Conference, pp. 530–537, Nov. 1990.

Cygnus Solutions; "Working with Cygnus Insight, the Visual Debugger". Accessed on Aug. 31, 1999. Retrieved from the Internet: <http://www.cygnus.com/pubs/gnupro/1_GS>, Jun. 1991.

Cygnus Solutions; "Debugging with GDB; The GNU source–level debugger". Accessed on Aug. 31, 1999. Retrieved from the Internet: <http://www.cygnus.com/pubs/gnupro/3_dbug/b_debugging_with_GBD>, Sep. 1993.

Technishe Universitat Braunschweig; "DDD v3.1; Data Display Debugger". Accessed on Aug. 31, 1999. Retrieved from the Internet: <http://www.cs.tu–bs.de/softech/ddd>, Jan. 1998.

Auguston et al.; "A debugger and assertion checker for the Awk programming language". Proceedings of Software Engineering Education and Practice International Conference, pp. 242–249, Jan. 1996.

*Primary Examiner*—Tariq R. Hafiz
*Assistant Examiner*—Kelvin E. Booker
*Attorney, Agent, or Firm*—Bromberg & Sunstein LLP

[57] ABSTRACT

A method of debugging a software program in one embodiment includes the step of identifying a series of program blocks constituting at least a part of the program. With respect to each block, the method includes defining and associating an entry debug page for an entry point for the block. Each entry debug page provides a structure (i) for data that are sufficient to permit the associated block to execute and (ii) for displaying at least some of such data. The method of this embodiment also includes permitting the program to run through a desired series of program blocks and displaying at least one of the entry debug pages associated with the desired series of program blocks. Related apparatus embodiments and embodiments of media storing program code are also provided.

27 Claims, 6 Drawing Sheets

A PROGRAM SEGMENT, BLOCKING AND DEBUG PAGES

A PROGRAM SEGMENT, BLOCKING AND DEBUG PAGES

THE FLOW OF INFORMATION AND DEBUG PAGES IN A TYPICAL VISUAL BASIC IMPLEMENTATION OF THE DEBUGGER

FIG. 3

A DEBUG ENTRY PAGE

AddUser:AddUser:Debug Input

[Forward] [Back] [Go] [End]

Past Debug Moves:
AddUser:Start Debug Input-Forward
AddUser:AddUser:Debug Input-Forward
AddUser:AddUser:Debug Output-Back

| Field | Value |
|---|---|
| AddUser_i_strName | Mordechai Halpern |
| AddUser_i_strEMail | mhalpern@originsoftware.com |
| AddUser_i_strPhone1 | 617-661-6700 |
| AddUser_i_strPhone2 | 617-661-7101 |
| AddUser_i_strAddr1 | 8 Lathorn Rd |
| AddUser_i_strAddr2 | |
| AddUser_i_strCity | Northborough |
| AddUser_i_strST | MA |
| AddUser_i_strZip | 01532 |

Balance Inbank: Start Debug Input

[Forward] [Back] [Go] [End]

Start_CustomerList: [290 Muzi Dolores ▼]

Past Debug Moves
- Balance Inbank:Start:Debug Input-Forward
- Balance Inbank:Get Accounts:Debug Input-Forward
- Balance Inbank:Get Accounts:Debug Output-Forward
- Balance Inbank:Checking Balance:Debug Input-Forward
- Balance Inbank:Checking Balance:Debug Output-Back
- Balance Inbank:Checking Balance:Debug Input-Back
- Balance Inbank:Get Accounts:Debug Input-Back
- Balance Inbank:Start:Debug Input-Forward
- Balance Inbank:Get Accounts:Debug Input-Forward
- Balance Inbank:Get Accounts:Debug Output-Back

AN ENTRY DEBUG PAGE CONTAINING A COMBO CHOICE LIST

FIG. 5

THE CORRESPONDING EXIT DEBUG PAGE

Balance Inbank:Get Accounts:Debug Output

[Forward] [Back] [Go] [End]

Get_Accounts_ReturnValue      0
Get_Accounts_ReturnMsg        All Accounts Found
Get_Accounts_CustomerID       290 Muzi Delores
Get_Accounts_SavingsID        290_02
Get_Accounts_CheckingID       290_01
Get_Accounts_RevolvingID      290_03

Past Debug Moves

Balance Inbank:Start:Debug Input-Forward
Balance Inbank:Get Accounts:Debug Input-Forward
Balance Inbank:Get Accounts:Debug Output-Forward
Balance Inbank:Checking Balance:Debug Input-Forward
Balance Inbank:Checking Balance:Debug Output-Back
Balance Inbank:Checking Balance:Debug Input-Back
Balance Inbank:Get Accounts:Debug Input-Back
Balance Inbank:Start:Debug Input-Forward
Balance Inbank:Get Accounts:Debug Input-Forward

FIG. 6

FORWARD AND REVERSE HIERARCHICAL PAGE LEVEL DEBUGGER

FIELD OF INVENTION

The present invention relates to arrangements implemented in digital computers for debugging software and for monitoring performance of computer programs running in digital computers.

BACKGROUND ART

Typical debuggers known in the prior art are designed to follow program execution one line of code after another. Use of a typical prior art debugger is an extremely slow process, as the program developer steps through the lines and inspects the variables in each line. Current debuggers do allow the user to put breakpoints at specific lines and watch specific variables for changes. The general method, however, involves line-by-line stepping and individual variable inspection.

SUMMARY OF THE INVENTION

The invention provides in a preferred embodiment, a method of debugging a software program. In this embodiment the method includes the step of (a) identifying a series of program blocks constituting at least a part of the program. Each program block may be selected from the group including but not limited to program modules, object methods, functions, and code segments. Each program block has at least one entry point where program flow enters the block and least one exit point where program flow leaves the block. (As used in this description and the following claims, the term "entry point" includes all modes by which control enters the block, including for example, subroutine calls and function calls. As used in this description and the following claims, the term "exit point" includes program exits, function returns, and other procedures that return control to a point outside the block.) With respect to each block, the method includes (b) defining and associating an entry debug page for an entry point for the block. Each entry debug page provides a structure (I) for data that are sufficient to permit the associated block to execute and (ii) for displaying at least some of such data. As used in this description and the following claims, an "entry debug page" will still qualify as such if it is represented in a series of fragments that collectively provide a structure (I) for data that are sufficient to permit the associated block to execute and (ii) for displaying at least some of such data. Similarly, as used in this description and the following claims a "debug page" will still qualify as such if shared completely or partially by a number of blocks. The method of this embodiment also includes © permitting the program to run through a desired series of program blocks and displaying at least one of the entry debug pages associated with the desired series of program blocks.

In a further and related embodiment, the method includes defining and associating an exit debug page for each exit point for the block, wherein each exit debug page provides a structure for data that may be displayed that are pertinent to the associated block after it has been executed. Furthermore there may be included the step of changing at least one item of data in one of the entry debug pages and permitting the program to run through a desired series of program blocks and displaying at least one of the entry debug pages or the exit debug pages associated with the desired series of program blocks.

In another related embodiment, the method may also include determining a measure of the execution time of a desired series of program blocks. This may be achieved by timing the execution of a number of repetitions of the desired series of program blocks.

In yet another related embodiment, there may include the further step of dividing a given program block for which additional debugging is desired into a series of sub-blocks and repeating steps (b) and (c) treating each sub-block as a separate block.

In accordance with another embodiment of the invention there is provided a method of debugging a software program, in which the program is permitted to return control to a prior position. The method includes:
 a. identifying a series of program blocks constituting at least a part of the program (each block has at least one entry point);
 b. with respect to each block, defining and associating an entry debug page for each entry point for the block, wherein each entry debug page provides a structure for data that are sufficient to permit the associated block to execute;
 c. permitting the program to run through a desired series of program blocks; and
 d. causing the program to return control to an entry debug page associated with a block that has been previously executed.

Apparatus embodiments for debugging a software program are also provided. In accordance with one embodiment, an apparatus includes:
 a. a page storage arrangement for storing page information associated with a series of program blocks constituting at least a part of the program (each block has at least one entry point and one exit point, and the page information defines an entry debug page for each entry point for each of the program blocks);
  wherein each entry debug page provides a structure (I) for data that are sufficient to permit the block associated with such entry debug page to execute and (ii) for displaying at least some of such data; and
 b. a processor for permitting the program to run through a desired series of program blocks and for causing the display of at least one of the entry debug pages associated with the desired series of program blocks.

In further related embodiments of the apparatus, the page information stored in the page storage arrangement includes information defining an exit debug page for each exit point for each of the program blocks, wherein each exit debug page provides a structure for data that may be displayed that are pertinent to the associated block after it has been executed. There is also provided an arrangement for changing at least one item of data in one of the entry debug pages so that the processor may permit the program to run through a desired series of blocks with data that has been modified and to display at least one of the entry debug pages or the exit debut pages associated with the desired series of program blocks. Each block, in further embodiments, may be selected from the group including program modules, object methods, functions, and code segments. There may be further provided a blocking arrangement for automatically blocking the program according to natural boundaries of the program; the blocking arrangement may therefore in appropriate circumstances identify object methods as separate blocks. Related embodiments may further include a code timer for measuring the execution time of the desired series of program blocks. The code timer may include an arrangement for timing the execution of a number of repetitions of the desired series of program blocks.

In a related embodiments there are provided a computer-readable digital storage medium digitally encoded with program code, which when loaded into a suitable computer establishes the apparatus embodiments described above.

BRIEF DESCRIPTION OF THE DRAWINGS

FIGS. 3 and 4 are representative entry debug and exit debug pages respectively for a program block to which they are anchored.

FIGS. 5 and 6 are representative entry debug and exit debug pages pertinent to a block that executes on data that are more than simple variables; here data include a combo box capable of showing a selection list, and showing a list of pages previously viewed from the beginning of the program.

DETAILED DESCRIPTION OF SPECIFIC EMBODIMENTS

Figure 1:
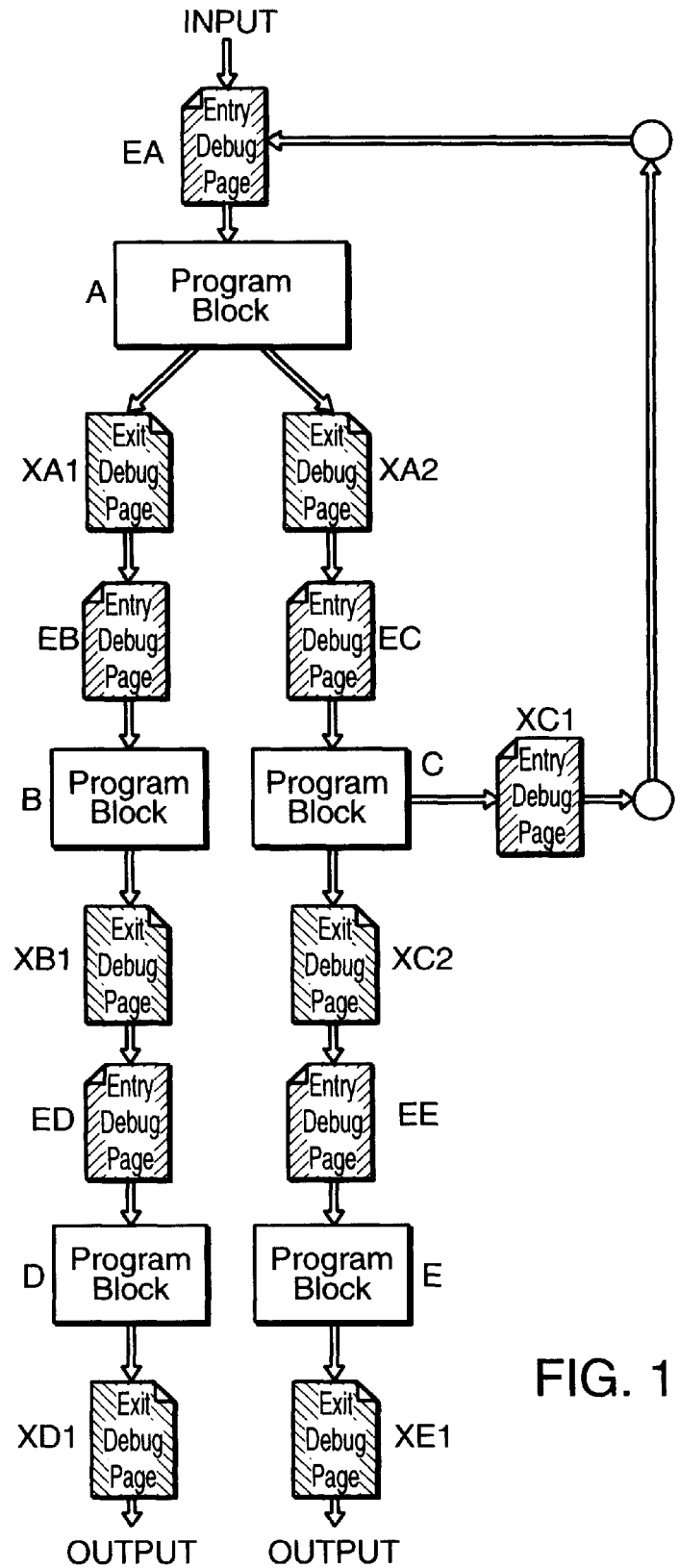
FIG. 1 is a block diagram of a segment of a computer program that has been divided into blocks that have been placed in context for use with a preferred embodiment of the present invention for debugging the program segment.

In accordance with a preferred embodiment of the present invention there is provided a method for constructing new faster debuggers. It is well known that considerable programming resources are spent on debugging. The acceleration of the process of debugging is then of critical importance to the industry.

The embodiment allows a top level debugging phase for all programs. In this phase bad blocks can be rapidly identified. Consequently the whole process of debugging gets structure and converges rapidly. Performance can also be rapidly measured.

In this embodiment, the program is put into block components. Input and output pages are defined for each block. In the process of debugging, the pages are displayed including all relevant data. The pages also contain enough information so that the debugger can step backward after execution of a block and try to execute the block again with different data. The back movement is new for debugging and contributes to speeding the debugging process. Through the forward-backward movement, the debugger also supports performance monitoring. Performance monitoring can be accomplished by creating a "performance loop" around a single block or a sequence of blocks and recording the times spent by the program as it executes the performance loop.

In this new method the developer identifies specific blocks in a program segment and defines "debug pages" anchored to the blocks chosen. Blocks may be any functional pieces of code. They can be functions or object-methods or just code segments within the program. Blocks may have a single entry, multiple entries, single exit or multiple exits.

A debug page is a structure that can contain any combination of data elements or data structures in any form (objects classes, simple variables, tables, lists, figures, etc.). For any chosen block a type of debug page, called an "entry debug page," is anchored to each entry point of the block. The entry debug page contains enough data elements so that the block can be executed.

For any chosen block, another type of debug page, called an "exit debug page," is anchored to an exit point from the block. The exit debug page contains data elements that were handled or modified by the block or any other data elements available at that point in the program. The creation of exit debug pages is optional; some blocks can have only entry pages.

The definition of any debug page may also contain information of how the page will display its data or assumes a standard default display method. The display instructions for the page may dictate the display of all the contents of the page or only a portion of it.

Upon program execution, the debugger in accordance with the present embodiment performs a number of functions. It stores all the entry debug pages defined and their data contents, it may also store some or all the exit debug pages. It keeps track of the sequence of pages. It displays each entry pages according to the display instructions for such page before entry or call to the block to which the entry page is anchored. The entry debug page contains a "continue" button which if selected, causes control of the program to continues and enter the block to which the entry debug page is anchored. Before pushing the "continue" button, the user is allowed to modify any data element displayed. The entry page also contains a "back" button, which, if selected, causes control to return to the entry page of the prior block.

After execution of the block, the debugger displays the exit debug page anchored to the block. The exit debug page contains two buttons, "continue" and "back." If the user pushes the continue button the program continues execution to the next block in the program. If the user pushes the "back" button of the exit debug page, the program goes back to the start of the block and displays the entry debug page for the block. The user may now modify the entry data and try the execution of the block again. This process may be repeated for every block defined.

Overall the debugger of this embodiment controls the display of pages, the method of stepping, and the capability of changing the values of the data elements. The debugger causes storage of the pages and all the data values associated with them.

The following additional optional features may be supported:

Setting breakpoints to display only a specific page

A GO mechanism to step to the next breakpoint page without displaying the pages in between Showing a page subject to some conditions related to the values or change of values of data elements in the page.

If an error is discovered in any of the blocks the user can either use a standard debugger or further use a debugger method in accordance with the present embodiment. This involves further decomposing the block and applying the method to the new block.

A method for measuring performance is also provided in accordance with the present embodiment. A "performance loop" around a single block or a sequence of blocks is introduced. Times of execution for the performance loop are recorded. The full profile of the application and its time behavior can be thus accomplished.

The embodiment described has been implemented with the use of ActiveX objects in a Visual Basic environment, available from Microsoft Corporation, Redmond, Wash. The Visual Basic (VB) program provides Forms for input and output and small Classes that implement the essence of the program.

FIG. 1 is a block diagram of a segment of a computer program that has been divided into blocks that have been placed in context for use with a preferred embodiment of the present invention for debugging the program segment.

Shown in the figure are Program Blocks A, B, C, D, and E. Also shown are entry debug pages for these blocks as items EA, EB, EC, ED, and EE respectively. Similarly, there are shown exit debug pages from these blocks XA1, XA2, XB, XC1, XC2, XD1, and XD2. Upon entry to block A, entry debug page EA is displayed. The user has an option of changing some or all of the data elements and then continuing.

There are two exits from program block A, either debug page XA1 or debug page XA2 is displayed. The user at this point can inspect the output data and simply continue or go back to EA. After finishing with block A the process continues in a straightforward manner to the downstream blocks. The user can always inspect the entry debug pages, modify them if needed, and continue the process. Which exit is chosen is a function of the input data to the block and the block functionality. The user can go back and forth along the program segment until he is convinced that the program segment functions properly, or he has identified all the bad blocks.

The typical flow of events in the VB programming environment used with this embodiment is as follows:

a) The user inputs his data using a VB input form.
b) The form calls one of the class object methods available to perform the transaction.
c) The method may call other available class methods to assist in performing the transaction.
d) Once the transaction is executed, the relevant output data are displayed in a new output form or the old input form is used for display.

Figure 2:
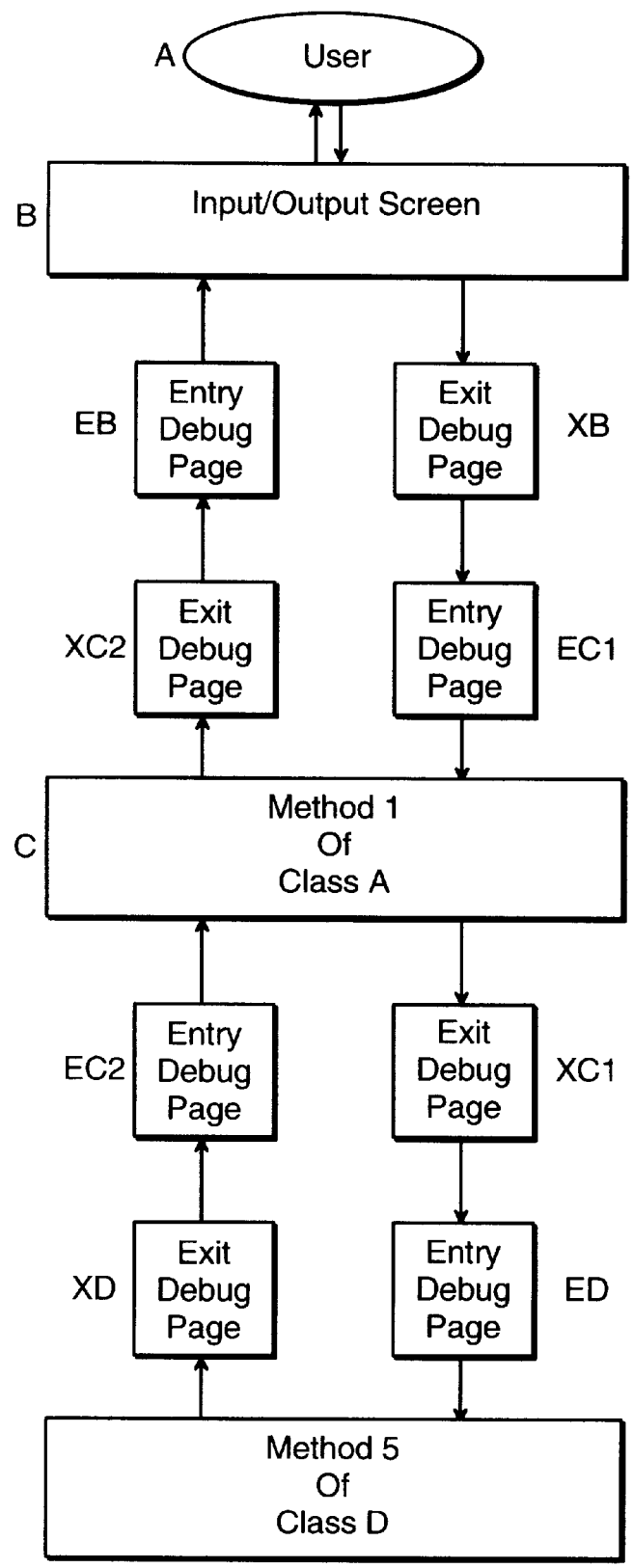
FIG. 2 is a block diagram of a transaction within a computer program, in a manner similar to that of FIG. 1, where the transaction exists in a Visual Basic environment and wherein the blocks are class methods.

These steps are shown in further detail in the example illustrated in FIG. 2, which is a block diagram of a transaction within a computer program, in a manner similar to that of FIG. 1, where the transaction exists in a Visual Basic environment and wherein the blocks are class methods.

a) The user (A) Inputs his transaction data using a VB Form (B)
b) The form calls one of the Class object methods to assist in performing the transaction (C)
  b1) Upon Leaving B the Exit Debug Page XB is displayed
  b2) Before Activation of the method in C the Entry Debug page EC1 is displayed
c) The method in C may call other available class methods to assist in performing the transaction
  c1) In this example it is calling the method in D
  c2) Upon Leaving C the Exit Debug Page XC1 is displayed
  c3) Before Activation of the method in D the Entry Debug page ED is displayed
d) Once d is executed the transaction starts on its return path to the user
  d1) The Return path includes the display of the debug pages XD, EC2, XC2 and EB
e) Once the transaction is executed the relevant output data are displayed in a new output form or the old input form is used for display.

Figure 4:
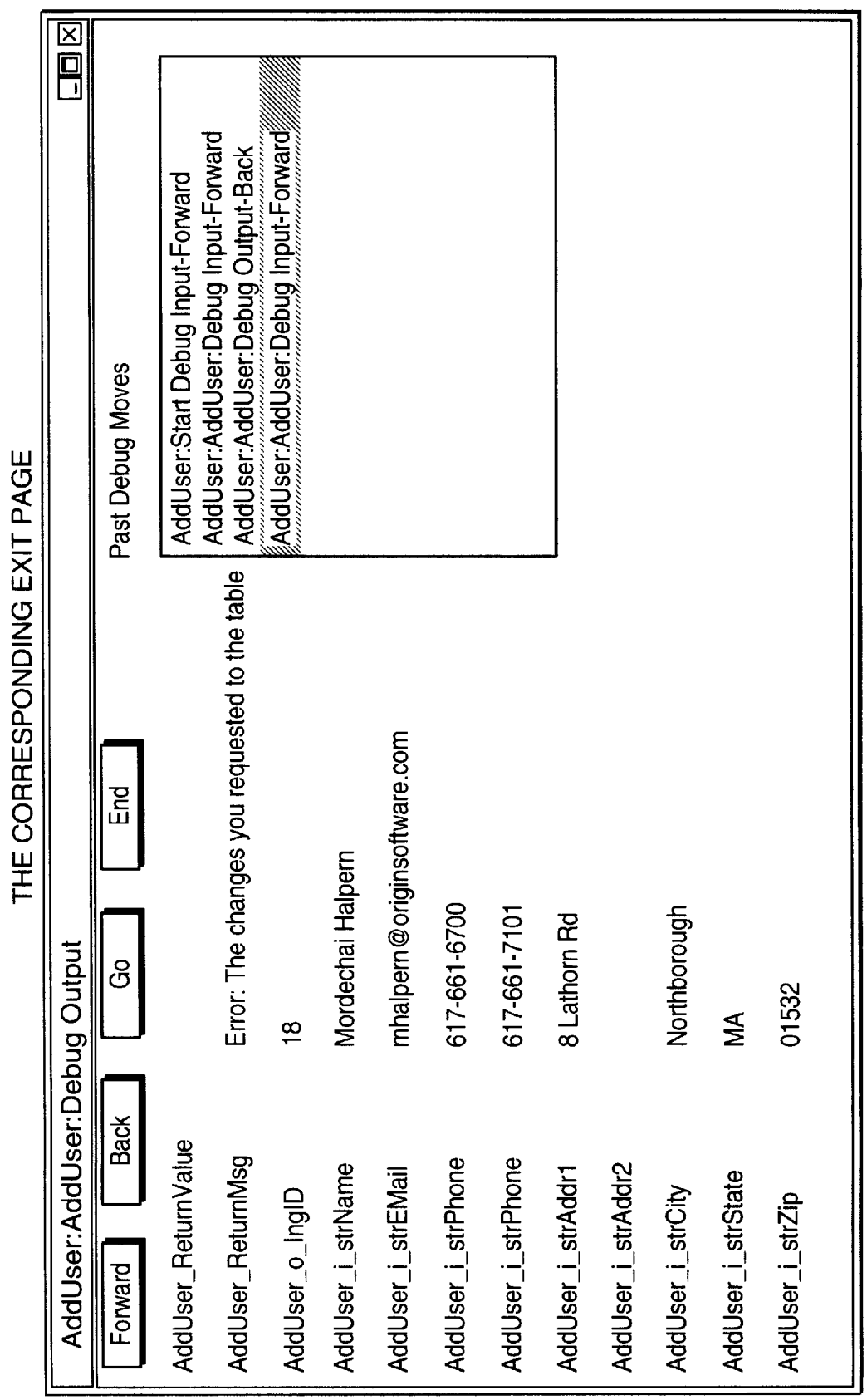

FIGS. 3 and 4 show actual entry debug and exit debug pages respectively for a program block to which they are anchored, obtained using an embodiment of the invention developed for use in a Visual Basic environment. Here the data displayed are text strings on which the block, to which the debug pages are anchored, operates.

FIGS. 5 and 6 are representative entry debug and exit debug pages, obtained from the same embodiment of the invention, pertinent to a block that executes on data that are more than simple variables. Here data include a combo box, capable of showing a selection list, required for operation of the block to which the entry debug page is anchored. Also shown on the debug pages here is a list of pages previously viewed from the beginning of the program.

The Visual Basic programming environment in which the embodiment has been implemented is a typical implementation owing to the current popularity of object oriented programing and Visual Basic. The program to be debugged may be naturally blocked by using the different available class methods. Thus in this embodiment each method represents a block of code to which debug pages can be anchored. The debugger of this embodiment may itself be implemented as an object class whose methods are called before and after any entry to a new method.

The debugger has two parts: a design time class (The Designer) and a runtime class (The Executive). These parts are discussed below.

The Designer

All the classes and methods of the program to be debugged are treated here as blocks that are registered with the Designer. This includes all classes, methods, and input and output parameters to those methods. (Typical object registration.) In addition to this traditional type of object registration, the Designer allows the user to define display-forms connected with the entry points and exit points for each class method. Thus the input and output data for the method can be displayed when requested. For each debug page, a form is defined for displaying the input and/or output parameters for the related method, that is, for the block to which the debug page is anchored. The Designer stores the data in a database.

In a preferred embodiment, the Designer is implemented in a VB (Visual Basic version 5, available from Microsoft Corporation, Redmond, Wash.) environment using object methods described below. VB requires a hierarchy as follows:

Project
   Class
      Method or Property
         Parameter

Using this hierarchy, The Designer of this embodiment provides the following functionalities:

Project Registration (Project can contain multiple classes)
   Add a new project (providing parameters for project name, version, and description)
   Edit A Project
   Delete a Project Class Registration Operations (A class contains multiple Methods)
   Add A new class to a project (ClassName)
   Edit A Class
   Delete a Class Method/Property Registration Operations (Methods contain multiple parameters)
   Add A new method to a Class (MethodName, Type=Sub/Function/Property)
   Edit A Method
   Delete a Method Parameter Registration Operations
   Add A New Parameter to a Method (ParameterName, Position, Datatype, Function=Input/Output/Input+Output [this item tells how the block handles the parameter], Display=Entry/Exit/Entry+Exit/None [this item tells whether the parameter be displayed on an entry debug page or an exit debug page or both or not at all], DisplayControl [this item determines the mode of display of the parameter, such as text box, list box, combo box, etc.], DisplayFlag [this item identifies the entry point or exit point to which the parameter refers])

Edit A Parameter

Delete a Parameter

It can be seen from the foregoing that the parameter definition includes whether this parameter will be displayed in any of the debug pages and the visual controls to be used in order to display it. As an alternative to the use of the DisplayFlag, the embodiment may be configured to display a map of the entry and exit pages (similar to that shown in FIG. 2), and permit the user to chose by graphic means where the parameter will appear. Indeed, it can be seen that the debugging functionality may be achieved as part of a system that also is used for creating the program that is to be debugged; in such a fashion debugging and program creation may be usefully integrated. In such an integrated system, the data used for program creation is automatically available and used for debugging. In such a system, the graphic selection of entry and exit pages for the parameter is performed at the time the parameter is defined for use in the program block.

The Executive

The Executive Object is called before and after each method's execution. The Executive displays the appropriate debug page. Once the debug page is inspected or modified, the user pushes the continue button and execution continues. The Executive keeps in a database all the pages (Forms) in the history of the program.

If the user selects the "back" button on an entry or exit debug page the Executive recalls the data needed by retrieving the appropriate entry page data and displays the required entry form. The data in the entry debug page are used to refresh the call to the block (which is here a method) to which the page is anchored. As required the data in the entry debug page are always sufficient for the execution of the anchor method.

In a preferred embodiment, the Executive is implemented in a VB environment using object methods as follows:

Initialize (Cleans all the page buffers set all counters to 0), called at start

Display_Entry_Page (displays entry page and halts, a modal form) Called before each method entry, Related parameters are transferred
 Forward: Moves to execute the related method (block)
 Back: Back to prior entry page
 Go: execute the full transaction, don't stop at the preceding pages
 End; Exit from Program Display_Exit_page (display exit page and halts, Modal form) Called after exit. Appropriate parameters transferred.
 Forward: Moves to execute the Next method (block), will typically stop at next entry page
 Back: Back to prior entry page
 Go: Execute the full transaction, don't stop at the preceding pages
 End; Exit from Program The Executive of this embodiment contains two generic VB forms, one for entry and one for exit. Each of these forms contains a single type of each supported control as the 0 s element of an array. (Example Text1(0)). Using the form data defined in the design stage, the Executive loads the needed display controls as higher members of the array, makes them visible, and copies the specified parameter data into them. Upon return the data are copied back to the application.

It should be pointed out that the VB implementation described above is purely an example for implementation of the invention. The invention is in no way limited to the VB environment. For example, similar implementations may be readily achieved in C++, Java, or virtually any other language environment.

What is claimed is:

1. A method of debugging a software program, the method comprising:
 a. identifying a series of program blocks constituting at least a part of the program, each block having at least one entry point and one exit point;
 b. with respect to each block, defining and associating an entry debug page for each entry point for the block at a program block level,
  wherein each entry debug page provides a structure (i) for data permitting the associated block to execute and (ii) for displaying at least some of such data;
 c. permitting the program to run, on a digital computer through a desired series of program blocks and displaying at least one of the entry debug pages associated with the desired series of program blocks, so that the program may be debugged by working at the level of program blocks and debug pages.

2. A method according to claim 1, wherein step (b) includes defining and associating an exit debug page for each exit point for the block, wherein each exit debug page provides a structure for data that may be displayed that are pertinent to the associated block after it has been executed.

3. A method according to claim 1, further comprising changing at least one item of data in one of the entry debug pages and repeating step (c).

4. A method according to claim 1, further comprising:
 causing the program to return control to an entry debug page associated with a block that has been previously executed.

5. A method according to claim 2, further comprising:
 changing at least one item of data in one of the entry debug pages and permitting the program to run through a desired series of program blocks and displaying at least one of the entry debug pages or the exit debut pages associated with the desired series of program blocks.

6. A method according to claim 1, wherein each block is selected from the group including program modules, object methods, functions, and code segments.

7. A method according to claim 1, further comprising:
 determining a measure of the execution time of the desired series of program blocks.

8. A method according to claim 7, wherein the step of determining a measure of the execution time includes timing the execution of a number of repetitions of the desired series of program blocks.

9. A method according to claim 1, further comprising:
 dividing a given program block for which additional debugging is desired into a series of sub-blocks and repeating steps (b) and (c) treating each sub-block as a separate block.

10. A method of debugging a software program, in which the program is permitted to return control to a prior position, the method comprising:
 a. identifying a series of program blocks constituting at least a part of the program, each block having at least one entry point;

b. with respect to each block, defining and associating an entry debug page for each entry point for the block, wherein each entry debug page provides a structure for data that are sufficient to permit the associated block to execute;

c. permitting the program to run, on a digital computer through a desired series of program blocks; and d. causing the program to return control to an entry debug page associated with a block that has been previously executed, so that the program may be debugged by working at the level of program blocks and debug pages.

11. Apparatus for debugging a software program, the apparatus comprising:

a. a page storage arrangement for storing page information associated with a series of program blocks constituting at least a part of the program, each block having at least one entry point and one exit point, such page information defining an entry debug page for each entry point for each of the program blocks;

wherein each entry debug page provides a structure (i) for data that is sufficient to permit the block associated with such entry debug page to execute and (ii) for displaying at least some of such data;

b. a processor for permitting the program to run through a desired series of program blocks and for causing the display of at least one of the entry debug pages associated with the desired series of program blocks, so that the program may be debugged by working at the level of program blocks and debug pages.

12. Apparatus according to claim 11, wherein the page information stored in the page storage arrangement includes information defining an exit debug page for each exit point for each of the program blocks, wherein each exit debug page provides a structure for data that may be displayed that are pertinent to the associated block after it has been executed.

13. Apparatus according to claim 11, further comprising an arrangement for changing at least one item of data in one of the entry debug pages so that the processor may permit the program to run through a desired series of blocks with data that has been modified.

14. Apparatus according to claim 12, further comprising:

an arrangement for changing at least one item of data in one of the entry debug pages so that the processor may permit the program to run through a desired series of blocks with data that has been modified and to display at least one of the entry debug pages or the exit debut pages associated with the desired series of program blocks.

15. Apparatus according to claim 11, wherein each block is selected from the group including program modules, object methods, functions, and code segments.

16. Apparatus according to claim 11, further comprising:

a blocking arrangement for automatically blocking the program according to natural boundaries of the program.

17. Apparatus according to claim 16, wherein the blocking arrangement identifies object methods as separate blocks.

18. Apparatus according to claim 11, further comprising:

a code timer for measuring the execution time of the desired series of program blocks.

19. Apparatus according to claim 18, wherein the code timer includes an arrangement for timing the execution of a number of repetitions of the desired series of program blocks.

20. A computer-readable digital storage medium digitally encoded with program code, which when loaded into a suitable computer establishes an apparatus for debugging a software program, the apparatus comprising:

a. a page storage arrangement for storing page information associated with a series of program blocks constituting at least a part of the program, each block having at least one entry point and one exit point, such page information defining an entry debug page for each entry point for each of the program blocks;

wherein each entry debug page provides a structure (i) for data that are sufficient to permit the block associated with such entry debug page to execute and (ii) for displaying at least some of such data;

b. a processor for permitting the program to run through a desired series of program blocks and for causing the display of at least one of the entry debug pages associated with the desired series of program blocks, so that the program may be debugged by working at the level of program blocks and debug pages.

21. A computer-readable digital storage medium digitally encoded with program code according to claim 20, wherein the page information stored in the page storage arrangement includes information defining an exit debug page for each exit point for each of the program blocks, wherein each exit debug page provides a structure for data that may be displayed that are pertinent to the associated block after it has been executed.

22. A computer-readable digital storage medium digitally encoded with program code according to claim 20, wherein the apparatus further comprises an arrangement for changing at least one item of data in one of the entry debug pages so that the processor may permit the program to run through a desired series of blocks with data that has been modified.

23. A computer-readable digital storage medium digitally encoded with program code according to claim 21, wherein the apparatus further comprises:

an arrangement for changing at least one item of data in one of the entry debug pages so that the processor may permit the program to run through a desired series of blocks with data that has been modified and to display at least one of the entry debug pages or the exit debut pages associated with the desired series of program blocks.

24. A computer-readable digital storage medium digitally encoded with program code according to claim 20, wherein the apparatus further comprises:

a blocking arrangement for automatically blocking the program according to natural boundaries of the program.

25. A computer-readable digital storage medium digitally encoded with program code according to claim 24, wherein the blocking arrangement identifies object methods as separate blocks.

26. A computer-readable digital storage medium digitally encoded with program code according to claim 20, wherein the apparatus further comprises:

a code timer for measuring the execution time of the desired series of program blocks.

27. A computer-readable digital storage medium digitally encoded with program code according to claim 26, wherein the code timer includes an arrangement for timing the execution of a number of repetitions of the desired series of program blocks.

* * * * *